(12) United States Patent
Fledersbacher et al.

(10) Patent No.: US 7,047,739 B2
(45) Date of Patent: May 23, 2006

(54) EXHAUST-GAS TURBOCHARGER FOR AN INTERNAL COMBUSTION ENGINE

(75) Inventors: Peter Fledersbacher, Stuttgart (DE); Siegfried Sumser, Stuttgart (DE); Helmut Finger, Leinfelden-Echterdingen (DE); Wolfgang Erdmann, Stuttgart (DE)

(73) Assignee: DamilerChrysler AG, Stuttgart (DE)

( * ) Notice: Subject to any disclaimer, the term of this patent is extended or adjusted under 35 U.S.C. 154(b) by 0 days.

(21) Appl. No.: 10/946,375

(22) Filed: Sep. 21, 2004

(65) Prior Publication Data

US 2005/0056015 A1   Mar. 17, 2005

Related U.S. Application Data

(63) Continuation-in-part of application No. PCT/EP03/00826, filed on Jan. 28, 2003.

(30) Foreign Application Priority Data

Mar. 22, 2002  (DE) .............................. 102 12 675

(51) Int. Cl.
  *F02D 23/00*   (2006.01)
  *F02B 37/12*   (2006.01)
  *F01D 17/14*   (2006.01)
  *F01D 17/16*   (2006.01)
  *F01D 9/02*    (2006.01)
(52) U.S. Cl. .................... 60/602; 415/157; 415/193
(58) Field of Classification Search ............ 60/602; 415/157, 158, 191, 192, 193, 194, 195; 417/407
See application file for complete search history.

(56) References Cited

U.S. PATENT DOCUMENTS

| 2,861,774 | A |   | 11/1958 | Buchi ........................... 60/602 |
| 4,776,168 | A |   | 10/1988 | Woollenweber ............... 60/602 |
| 5,855,117 | A | * | 1/1999  | Sumser et al. ................. 60/602 |
| 6,314,736 | B1| * | 11/2001 | Daudel et al. ................. 60/602 |
| 6,443,696 | B1| * | 9/2002  | Erdmann et al. .............. 60/602 |
| 6,536,214 | B1| * | 3/2003  | Finger et al. .................. 60/602 |
| 6,672,061 | B1| * | 1/2004  | Schmid et al. ................. 60/602 |
| 6,715,288 | B1| * | 4/2004  | Engels et al. .................. 60/602 |
| 6,834,500 | B1| * | 12/2004 | Sumser et al. ................. 60/602 |

FOREIGN PATENT DOCUMENTS

| DE | 196 15 237 | 10/1997 |
| DE | 199 05 637 | 8/2000 |
| DE | 100 29 807 | 3/2002 |
| DE | 42 42 494  | 9/2003 |
| GB | 002243975  | 4/1985 |

* cited by examiner

Primary Examiner—Sheldon J Richter
(74) Attorney, Agent, or Firm—Klaus J. Bach

(57) ABSTRACT

An exhaust-gas turbocharger in an internal combustion engine having a compressor in the induction tract and an exhaust-gas turbine in the exhaust-gas line wherein the exhaust-gas turbine has at least two spiral ducts which in each case open into a radial flow inlet passage. Arranged in the radial flow inlet passage is a guide cascade ring which is disposed between two axially delimiting walls. One of the walls is designed to be axially displaceable and adapted to accommodate the vanes of the guide cascade ring. The wall is displaceable axially outward to such an extent that the vanes of the radial guide cascade ring are no longer in contact with the wall and there is a direct, unobstructed flow path to an outflow duct in the exhaust-gas turbine.

5 Claims, 4 Drawing Sheets

EXHAUST-GAS TURBOCHARGER FOR AN INTERNAL COMBUSTION ENGINE

CROSS-REFERENCE TO RELATED APPLICATIONS

This is a continuation-in-part application of international application PCT/EP03/00826 filed Jan. 28, 2003 and claiming the priority of German application 102 12 675.5 filed Mar. 22, 2002.

BACKGROUND OF THE INVENTION

The invention relates to an exhaust-gas turbocharger for an internal combustion engine having a compressor in the induction tract and an exhaust-gas turbine in the exhaust-gas line, and, in particular, to an exhaust-gas turbocharger which includes a plurality of spiral ducts which direct exhaust gas to the turbine.

Such an exhaust-gas turbocharger is described in publication DE 42 42 494 C1. The turbocharger comprises an exhaust-gas turbine, which in a turbine housing, has a turbine wheel which is driven by the exhaust gases of the internal combustion engine. The exhaust gas is fed to the turbine wheel via a plurality of spiral ducts which direct the exhaust gas to the turbine wheel via in each case a radial flow inlet passage. In DE 42 42 494 C1, exemplary embodiments with two, three and four spiral ducts are described, to which in each case radial flow inlet passages are assigned in a distributed manner in various angular sectors over the circumference of the turbine wheel. Located in each flow inlet passage is a guide cascade which provides for a defined incident flow to the turbine wheel with adjustable swirl and volumetric flow. On account of the guide cascades, provided in various ways, in each flow inlet passage, the different damming behavior in the individual spiral ducts can be used for different applications. For example, in order to assist exhaust-gas recirculation, a guide cascade having a narrow passage of flow may be used in a first spiral duct for producing a high dynamic pressure. On the other hand, a guide cascade having a larger cross section of flow may be provided in a second spiral duct in order to make possible a largely choke-free exhaust-gas inflow to the turbine wheel, in particular during part-load operation of the internal combustion engine.

The different guide cascades are arranged on a common sleeve-shaped flow guide member. The flow guide member is designed to be axially displaceable, as a result of which wall sections of the flow diffuser which are of closed design and are continuous or free of interruptions can be pushed into individual flow inlet passages, and the effective flow cross section can accordingly be reduced. In this case, however, it has to be noted that the flow conditions can deteriorate significantly if a guide cascade is only partly exposed and if a flow inlet passage is partly closed by the wall of the flow guide member, as a result of which, in particular, the efficiency of the exhaust-gas turbocharger is impaired. For this reason, the flow guide member is normally either shifted into a position in which the flow inlet passage is completely closed or into a position in which the guide cascade extends over the entire axial width of the flow inlet passage.

It is an object of the invention to provide additional adjusting possibilities for an exhaust-gas turbocharger of the generic type using simple design measures. In particular, without impairing the flow conditions, it is to be possible to set intermediate positions in an infinitely variable manner for the axial width of the inlet flow passage to the turbine wheel.

SUMMARY OF THE INVENTION

In the exhaust-gas turbocharger according to the invention, a guide cascade ring is held between two walls which axially delimit the radial flow inlet passage, one of the walls being designed to be axially displaceable and having a locating opening, into which the guide cascade can be pushed or from which the guide cascade can be pushed out during an axial movement of this wall. The axial width of the flow inlet passage can be set by the axial displacement of the movable wall. In this way, any desired intermediate positions are possible without impairing the flow conditions during the incident flow to the turbine wheel, since, with its defined guide cascade geometry influencing the flow, the guide cascade is effective in the free, effective flow inlet in each position of the axially displaceable wall. The wall is displaceable axially outward to such an extent that the vanes of the radial guide cascade ring are no longer in contact with the wall and there is a direct, unobstructed flow path to an outflow duct in the exhaust-gas turbine.

An adverse effect on the flow conditions can be ruled out. In particular, with a displaceable wall contoured in a fluidically favorable manner, the optimum radial flow inlet cross-section for the respective operating point of the engine can be set by varying the axial position of the wall, without adversely affecting the arrangement of the turbine wheel as a result.

The depth of the locating opening on the displaceable wall is advantageously adapted to the axial extent of the guide cascade, so that the guide cascade can be pushed into the locating opening until the radial flow inlet passage is completely closed or is closed except for a residual gap. In particular in conjunction with an exhaust-gas turbine designed as a combination turbine, which also has a semi-axial flow inlet passage in addition to the radial flow inlet passage, complete uncoupling from the semi-axial inlet flow passage is possible during the closing of the radial inlet flow passage. As a result, the combination turbine can be reduced to an axial-flow turbine in certain operating states of the internal combustion engine, as a result of which an increase in efficiency is possible. This is effected in particular at low mass rates of flow of the exhaust gas in the low speed range and at high loads of the internal combustion engine, as a result of which the efficiency advantage of the axial-flow turbine over a radial-flow turbine comes into effect. In this case, a semi-axial flow inlet passage is also precisely assigned in each case to a spiral duct and a radial flow inlet passage, as a result of which, by individual cylinders of the internal combustion engine being assigned as desired to each spiral duct, the pressure impulse which occurs during opening of the exhaust of the respective cylinder can be utilized even at low mass rates of flow of the exhaust gas.

The exhaust-gas turbocharger described can be used in both four-cylinder internal combustion engines and six-cylinder internal combustion engines. In four-cylinder in-line engines, the exhaust gases of the two middle cylinders are expediently combined and fed to one spiral duct, and in the same way the exhaust gases of the outer cylinders are combined and fed to the second spiral duct. In a six-cylinder in-line engine, two spiral ducts may likewise be provided, in each case three cylinders arranged one behind the other being connected in each case to a spiral duct.

In radial exhaust-gas turbines, possibly also in combination turbines having an additional semi-axial flow inlet passage, a ram induction for the drive of the turbine wheel can be advantageously utilized by the separate combining of the exhaust gases of individual cylinders of the internal combustion engine. During the ram induction, a high proportion of the kinetic energy can be utilized by a pre-exhaust impulse being directed via the respective spiral duct to the turbine wheel when the exhaust valves are opened.

Further advantages and expedient embodiments will become apparent from the following description with reference to the drawings.

BRIEF DESCRIPTION OF THE DRAWINGS

For a better understanding of the invention reference may be made to the accompanying drawings exemplary of the invention, in which.

DESCRIPTION OF THE PREFERRED EMBODIMENTS

Figure 1:
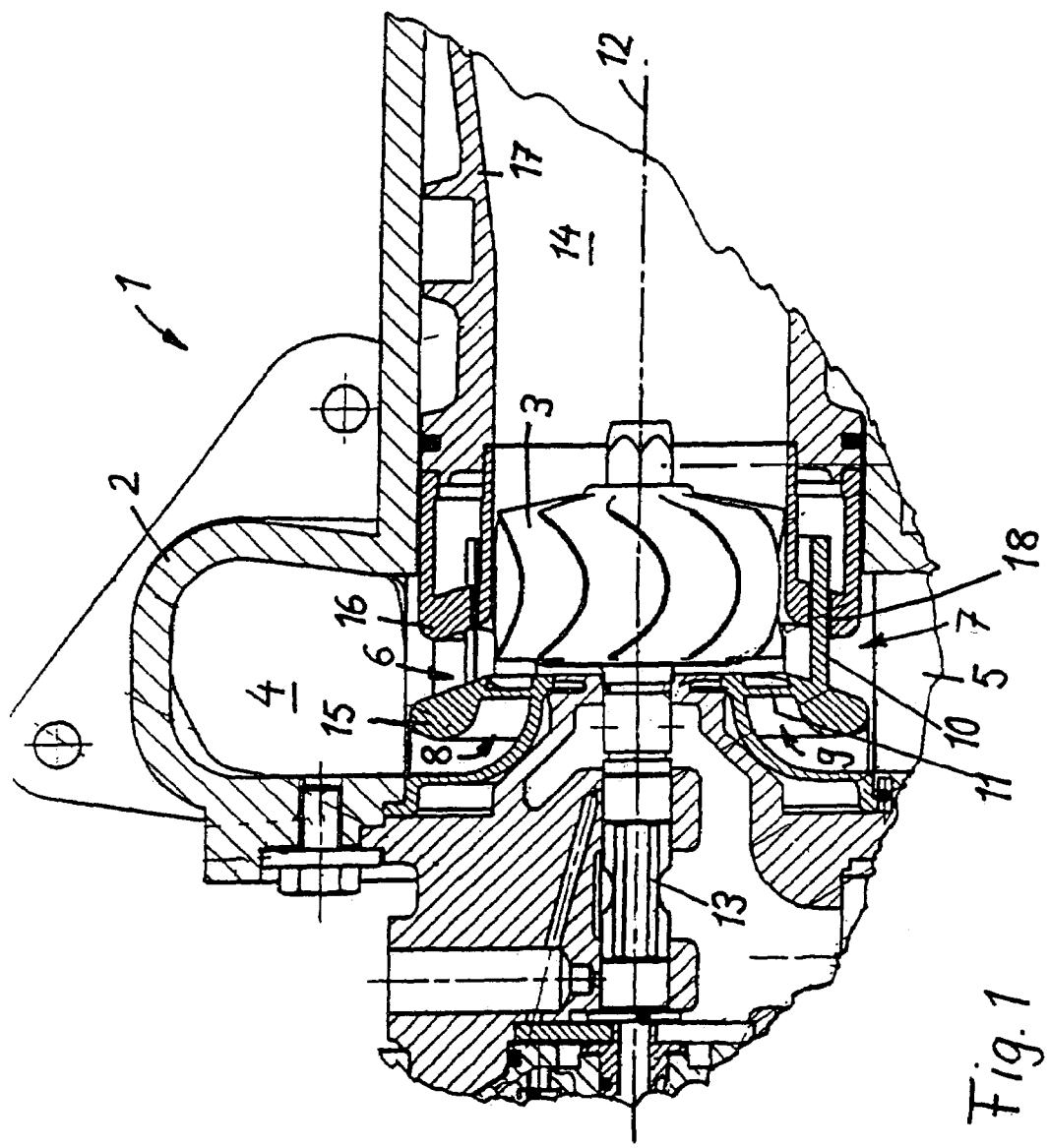
FIG. 1 shows a section through an exhaust-gas turbine of an exhaust-gas turbocharger for an internal combustion engine, having a radial and a semi-axial flow inlet passage to the turbine wheel, a guide cascade with an axially displaceable wall being disposed in the radial flow inlet passage.

The exhaust-gas turbine 1 shown in longitudinal section in FIG. 1 is part of an exhaust-gas turbocharger for an internal combustion engine. The exhaust-gas turbine 1 is arranged in the exhaust-gas line of the internal combustion engine and is driven by the exhaust gases of the internal combustion engine. The exhaust-gas turbine in turn drives a compressor in the induction tract of the internal combustion engine, combustion air drawn in being compressed via this compressor to an increased charge pressure, at which the combustion air is directed into the cylinder inlets of the internal combustion engine.

The exhaust-gas turbine 1 is designed as a combination turbine having a semi-axial and a radial flow inlet cross section. The exhaust-gas turbine 1 has two separately designed spiral ducts 4 and 5, for example, which communicate with the exhaust-gas line of the internal combustion engine and via which exhaust gas of the internal combustion engine can be fed to the turbine wheel 3. Each spiral duct 4, 5 is expediently connected via separate exhaust-gas conduits to in each case some of the cylinders of the internal combustion engine, so that only the exhaust gas of the relevant cylinders is directed into the respective spiral duct 4 or 5. In certain operating states of the internal combustion engine, this enables a ram induction to be utilized for increasing the output of the exhaust-gas turbine.

The two spiral ducts 4 and 5 are advantageously designed so as to be virtually fluid-tight or pressure-tight with respect to one another and each has a radial flow inlet passage 6 or 7, respectively, and a semi-axial flow inlet passage 8 or 9, respectively, via which the exhaust gas from the spiral ducts 4 and 5 strikes the turbine wheel 3 and drives the latter. The rotary movement of the turbine wheel 3 about the charger longitudinal axis 12 is transmitted via a shaft 13 to the compressor wheel in the exhaust-gas turbocharger. After striking the turbine wheel 3, the exhaust gas flows off axially from the exhaust-gas turbine 1 via an outflow duct 14.

A radial flow inlet passage 6 and a semi-axial flow inlet passage 8 are assigned to the first spiral duct 4. A radial flow inlet passage 7 and a semi-axial flow inlet passage 9 are assigned to the second spiral duct 5. The flow inlet passage of each spiral duct extends around the turbine wheel 3 in each case over an angular sector of 180°.

Arranged in the region of the two radial flow inlet passages 6 and 7 is a radial guide cascade ring 10 which extends over the entire circumference and which in particular has a multiplicity of guide vanes which are distributed uniformly over the circumference and via which the flow of the exhaust gas onto the turbine wheel can be influenced in a favorable manner. The radial guide cascade ring 10 covers both the radial flow inlet passage 6 of the first spiral duct 4 and the radial flow inlet passage 7 of the second spiral duct 5. In this case, it can be expedient to provide both guide cascade sections of identical design and guide cascade sections of different design, for example a guide cascade section having smaller rates of flow and a guide cascade section having larger rates of flow, in the region of both radial flow inlet passages 6 and 7.

In a corresponding manner, an encircling, semi-axial guide cascade ring 11 is also inserted into the semi-axial flow inlet passages 8 and 9 of the two spiral ducts 4 and 5. The semi-axial guide cascade ring also improves the incident flow to the turbine wheel 3 and can either be of identical or different design over both semi-axial flow inlet passages. The two guide cascade rings 10 and 11 are advantageously designed to be fixed or invariable. However, it may also be expedient to design at least one of the guide cascade rings so as to be adjustable for realizing a variable turbine geometry, in particular to provide it with adjustable guide vanes.

The two guide cascade rings 10 and 11 are held on an encircling, fixed wall 15 which extends radially into the two spiral ducts 4 and 5, respectively, and is arranged in the intermediate region between both guide cascade rings. The radially outer region of the fixed wall 15 has a fluidically favorable contour in order to permit an optimum inflow into the radial and semi-axial flow inlet passages 6 and 7 and respectively 8 and 9.

On the end face opposite the fixed wall 15, the radial flow inlet passages 6 and 7 are delimited axially by a second axially displaceable wall 16 which is designed to be displaceable in the direction of the longitudinal axis of the turbocharger. For this purpose, the displaceable wall 16 is connected to a sliding sleeve 17 which is arranged in the outflow duct 14 in an axially displaceable manner and can be actuated via an actuating element, not shown. On its side facing the fixed wall 15, the displaceable wall 16 has one or more locating openings 18 which extend over the circumference of the wall 16 and run in the axial direction. When the displaceable wall 16 approaches the fixed wall 15, these locating openings 18 serve to accommodate the guide cascade ring 10 or the guide vanes of the guide cascade ring 10. In this way, it is possible to reduce the distance between the walls 15 and 16 to such an extent that both walls 15 and 16 are in contact with one another and the radial flow inlet passages 6 and 7 are completely closed or are closed except for a remaining gap. In this way, the combination turbine can be reduced to a semi-axial turbine. By the radial guide cascade ring 10 being receivable in the locating openings 18, the radial flow inlet passages 6 and 7 can be adjusted in an infinitely variable manner. In order to ensure an optimum incident flow to the radial guide cascade ring 10 and to the turbine wheel 3 irrespective of the axial position of the adjustable wall 16, the adjustable wall 16 also has a fluidically favorable contour over its radially outer side.

According to an advantageous embodiment, provision is made for the adjustable wall 16 to be capable of being displaced axially outward to such an extent that the radial guide cascade ring 10 is not in contact with the wall 16 and there is a direct, unobstructed flow path between the two spiral ducts 4 and 5 and the outflow duct 14. This makes it possible to achieve a blow-off function while bypassing the flow path via the guide cascade rings.

Figure 2:
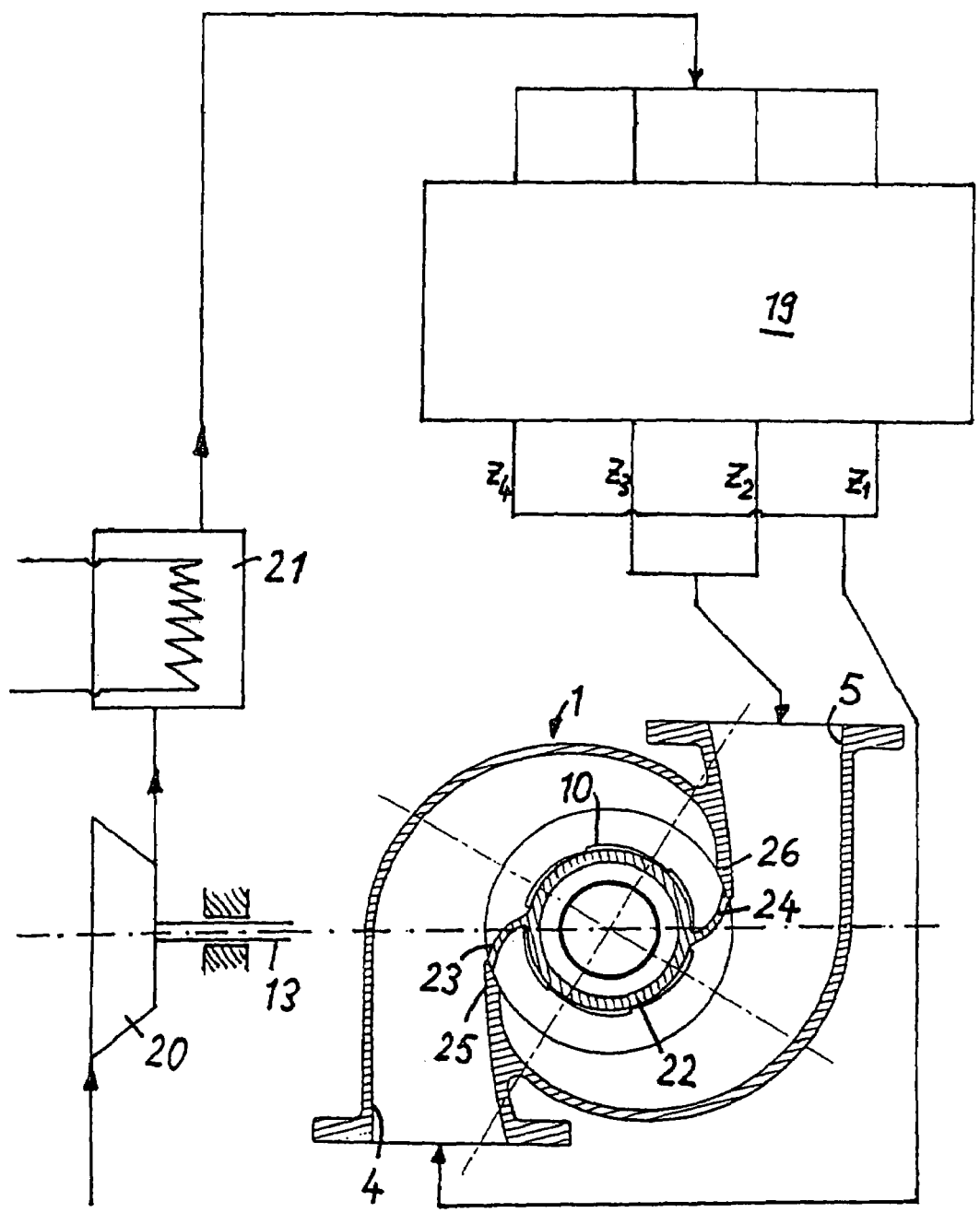
FIG. 2 shows a schematic illustration of a four-cylinder internal combustion engine with an exhaust-gas turbocharger, the exhaust-gas turbine of which is shown in cross section, having two separate spiral ducts for feeding exhaust gas to the turbine wheel.

In the schematic illustration of an internal combustion engine with associated units according to FIG. 2, the exhaust-gas turbine 1 of the exhaust-gas turbocharger is shown in section; on the other hand, the associated compressor 20 connected to the turbine wheel via the shaft 13 is only shown schematically. The exhaust gas of the internal combustion engine 19 is fed to the spiral ducts 4 and 5 of the exhaust-gas turbine 1, as a result of which the turbine wheel is set in motion and the movement of the turbine wheel 3 is transmitted via the shaft 13 to the compressor wheel in the compressor 20. The combustion air drawn in is compressed to an increased pressure, is then cooled in a charge-air cooler 21 and is finally fed at a desired charge pressure to the cylinder inlets of the internal combustion engine 19.

In the exemplary embodiment according to FIG. 2, the internal combustion engine 19 is a four-cylinder engine having cylinders $Z_1$, $Z_2$, $Z_3$ and $Z_4$, which are arranged in line. The exhaust gas of the outer cylinders $Z_1$ and $Z_4$ is combined and fed jointly to the first spiral duct 4 of the exhaust-gas turbine 1. In the same way, the exhaust gas of the middle cylinders $Z_2$ and $Z_3$ is combined and fed to the second spiral duct 5. The two spiral ducts 4 and 5 are separated from one another in a fluid-tight manner. For this purpose, a fixed ring 22 is arranged in the turbine housing coaxially to the charger axis, and separating tongues 23 and 24 extend radially outward on this ring 22 in front of the semi-axial cascade 11 and enable the flow paths in the spiral ducts 4 and 5 to be separated. Furthermore, separating tongues 25 and 26 are provided which interact with the separating tongues 23 and 24, are formed integrally with the spiral ducts 4 and 5. They have the function of providing a mutual seal by means of a minimum gap relative to the wall 16. Each spiral duct 4 or 5, respectively, opens via an angular sector of 180° into the incident-flow region to the turbine wheel.

The combining of the exhaust gases from in each case two cylinders of the internal combustion engine permits optimum use of the ram induction effect in the four-cylinder in-line engine.

Figure 3:
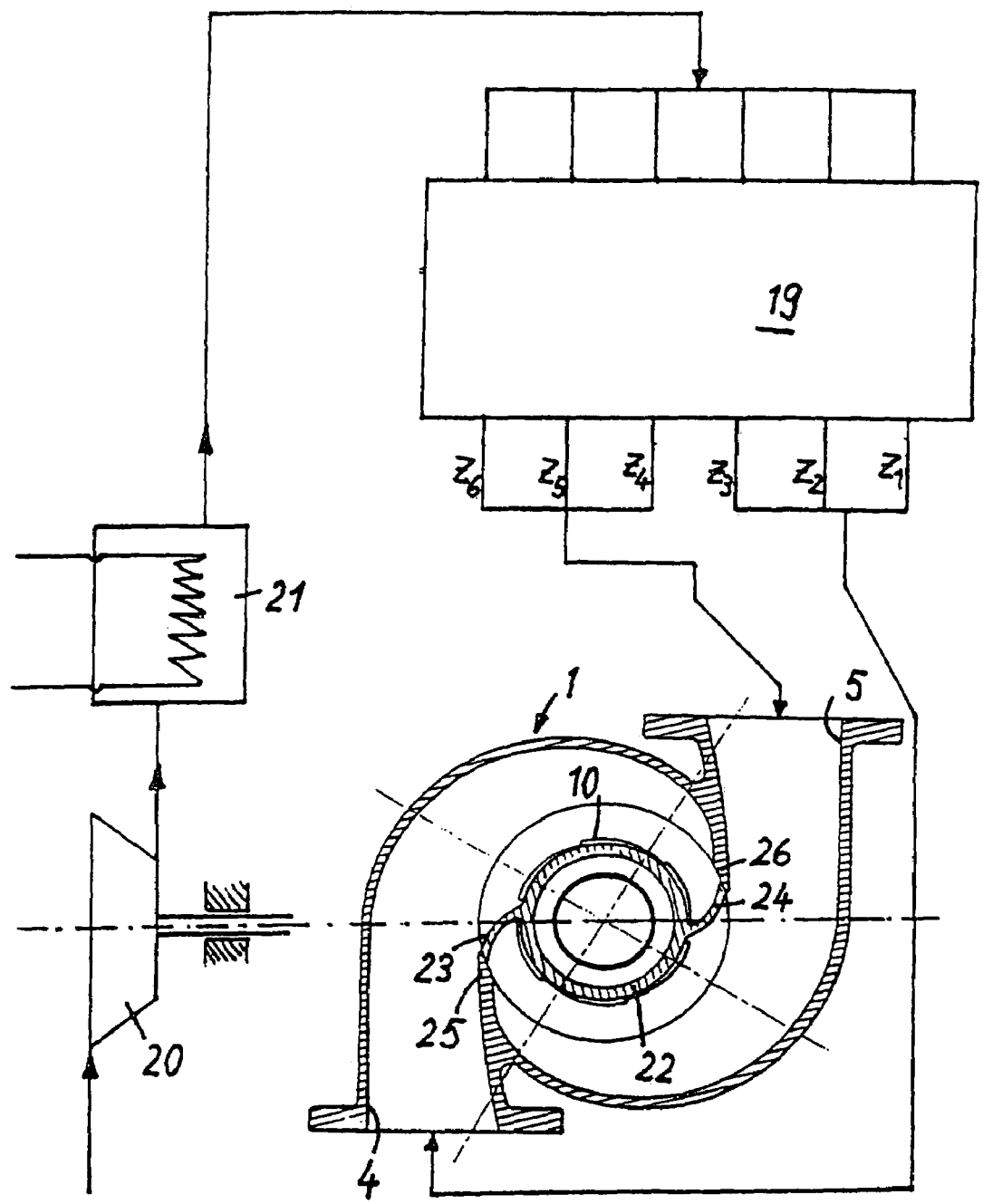
FIG. 3 shows an illustration corresponding to FIG. 2, but with a six-cylinder internal combustion engine; and, FIG. 4 shows a longitudinal section through an exhaust-gas turbine having an exclusively radial flow inlet passage.

The embodiment shown in FIG. 3 corresponds to that of FIG. 2, but with the difference that the internal combustion engine 19 in FIG. 3 is designed as a six-cylinder in-line engine having cylinders $Z_1$ to $Z_6$. The exhaust gases of the first three cylinders $Z_1$ to $Z_3$ following one another are combined and fed to the first spiral duct 4 of the exhaust-gas turbine 1. The exhaust gases of the remaining cylinders $Z_4$ to $Z_6$ are likewise combined and fed to the second spiral duct 5. A favorable ram induction can also be realized via this combination of the exhaust gases.

Figure 4:
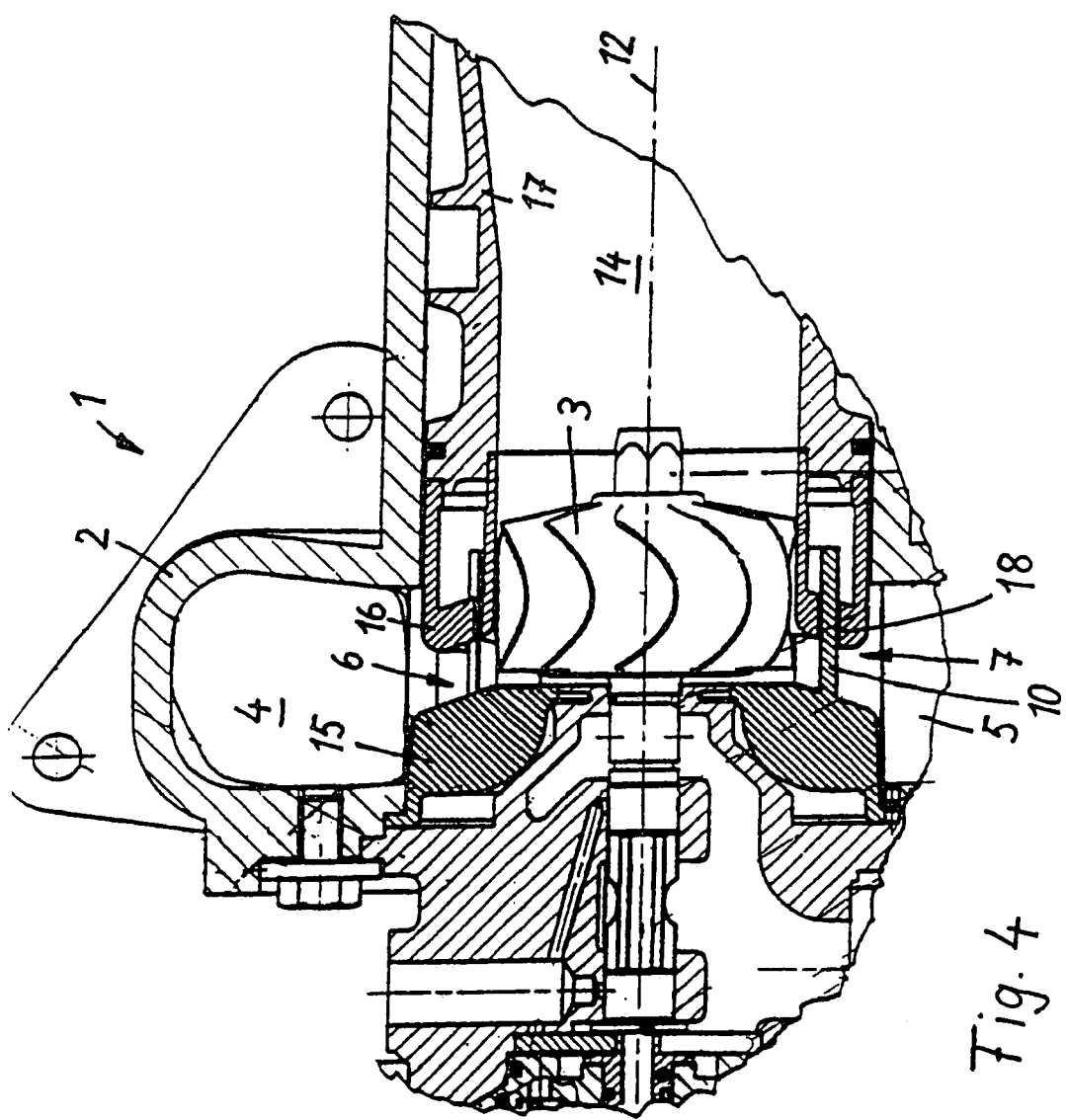

A further exhaust-gas turbine 1 is shown in a modified design in the exemplary embodiment according to FIG. 4. The exhaust-gas turbine 1 is designed as a radial-flow turbine having two radial flow inlet passages 6 and 7 which are assigned to the spiral ducts 4 and 5, respectively. On the other hand, a semi-axial incident flow to the turbine wheel 3 is not provided. Located in both radial flow inlet passages 6 and 7 is a radial guide cascade ring 10 which is held on the fixed wall 15 and is accommodated in a locating opening 18 in the axially displaceable wall 16. The wall 16 is axially displaceable and coupled to the sliding sleeve 17. The displaceable wall 16 can be adjusted between a closed position, in which both radial flow inlet passages 6 and 7 are closed, and a maximum open position, in which the radial flow inlet passages, with the guide cascade ring 10 located therein, assume their maximum flow cross section. If need be, the guide cascade 10 can also be displaced outward to such an extent that the radial guide cascade ring 10 is not in contact with the displaceable wall 16, as a result of which a direct flow path is formed between the spiral ducts 4 and 5, respectively, and the outflow duct 14 for realizing a blow-off function.

If need be, more than two spiral ducts may also be provided in the exhaust-gas turbine, for example three spiral ducts, to which in each case the exhaust gas of a certain number of cylinders of the internal combustion engine can be fed and which in each case open over a defined angular segment into the flow inlet passages to the turbine wheel.

What is claimed is:

1. An exhaust-gas turbocharger for an internal combustion engine, comprising a compressor (20) arranged in an induction tract and an exhaust-gas turbine (1) arranged in an exhaust-gas line of the engine, said exhaust-gas turbine (1) including a turbine housing (2) having a turbine wheel (3) and at least two spiral ducts (4, 5) which, in each case, open into a radial flow inlet passage (6,7), via which exhaust gas can be fed to the turbine wheel (3) of the exhaustgas turbine (1), a radial guide cascade ring (10) being arranged in the radial flow inlet passages (6,7), and being adjustable in a variable manner, the exhaust-gas turbine (1) being a combination turbine having radial flow inlet passages (6,7) and semi-axial flow inlet passages (8,9), one of the semi-axial flow inlet passages (8,9) being assigned to each radial flow inlet passage (6,7), the radial guide cascade ring (10) having vanes disposed between two walls (15,16) which axially delimit the radial flow inlet passage (6,7), one wall (16) being axially displaceable and having axial openings (18) which receive the vanes of the guide cascade ring (10) or from which the vanes of the guide cascade ring (10) are removable during an axial movement of the wall (16), the one wall (16) being displaceable axially while the vanes of the guide cascade ring (10) are inserted into the axial openings (18) in the axially displaceable wall (16) until the radial flow inlet passage (6,7) are closed and also being movable outwardly to such an extent that the vanes of the radial guide cascade ring (10) are no longer in contact with the wall (16) and there is a direct, unobstructed flow path between the two spiral ducts (4,5) and an outflow duct (14) in the exhaust-gas turbine (1).

2. The exhaust-gas turbocharger as claimed in claim 1, wherein the two spiral ducts (4,5), each respectively open into radial flow inlet passages (6,7), the radial flow inlet passages (6,7) each extending around the turbine wheel (3) over an angular sector of 180°.

3. The exhaust-gas turbocharger as claimed in claim 1, wherein said spiral ducts (4, 5) each further include separating tongues (25, 26), and the displaceable wall (16) has openings for accommodating the separating tongues (25, 26) and there are provided minimum gaps for the mutual sealing of the ducts (4, 5) and wall (16) relative to one another while permitting axial displacement of wall (16).

4. The exhaust-gas turbocharger as claimed in claim 1, wherein one of the walls (15) is arranged in a fixed position and the guide cascade (10) is connected to this fixed wall (15).

5. The exhaust-gas turbocharger as claimed in claim 4, wherein the other wall is a displaceable wall (16) which is axially adjustable via an axially displaceable sliding sleeve (17).

* * * * *